(No Model.)

J. DENO & T. H. REARDON.
CENTERER.

No. 347,925. Patented Aug. 24, 1886.

Witnesses
John H. Lynch
Gertrude M. Day

Inventors
Joseph Deno &
Timothy H. Reardon,
By Albert M. Moore, Their Atty

UNITED STATES PATENT OFFICE.

JOSEPH DENO AND TIMOTHY H. REARDON, OF LOWELL, MASSACHUSETTS, ASSIGNORS, BY MESNE ASSIGNMENTS, TO SAID REARDON AND JOHN CAWLEY, OF SAME PLACE.

CENTERER.

SPECIFICATION forming part of Letters Patent No. 347,925, dated August 24, 1886.

Application filed December 21, 1885. Serial No. 186,265. (No model.)

*To all whom it may concern:*

Be it known that we, JOSEPH DENO and TIMOTHY H. REARDON, citizens of the United States, residents of Lowell, in the county of Middlesex and Commonwealth of Massachusetts, have invented a certain new and useful Improvement in Centering Devices, of which the following is a specification.

Our invention relates to centering devices; and it consists in the combinations and devices hereinafter claimed and described, the object of which is to center the work with a drill or other tool held in a chuck, and to enable one readily to apply the centering devices to or to remove them from the chuck proper, and to enable a drill or other instrument to be removed from or inserted in the chuck proper, and there secured without removing therefrom the centering devices.

Figure 1:
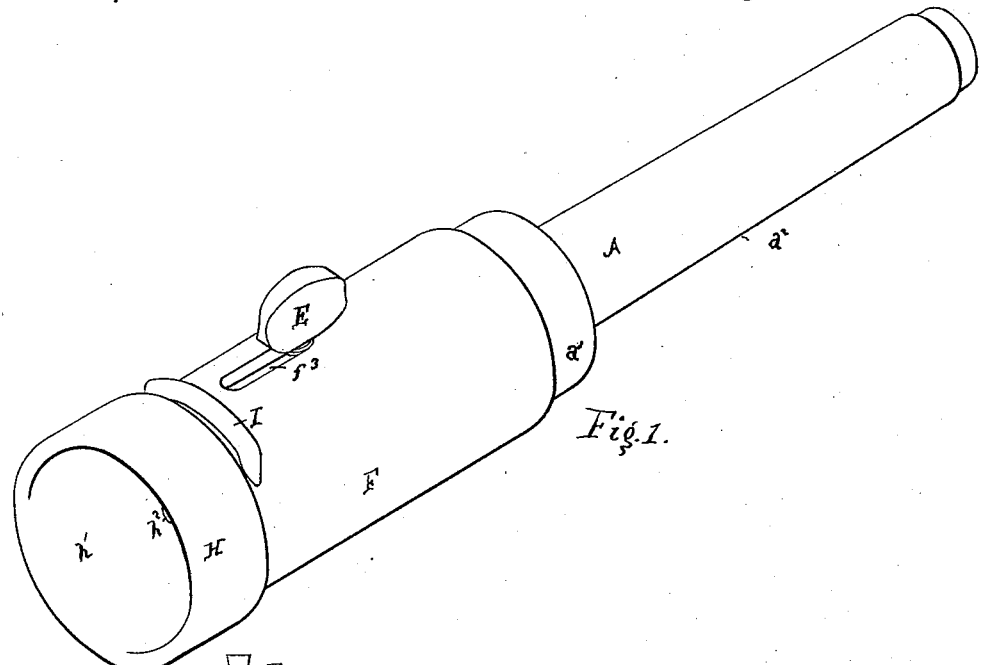
Figure 3:
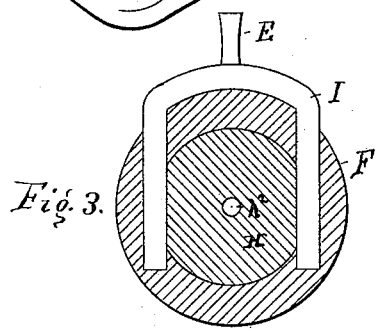
Figure 4:
Figure 2:
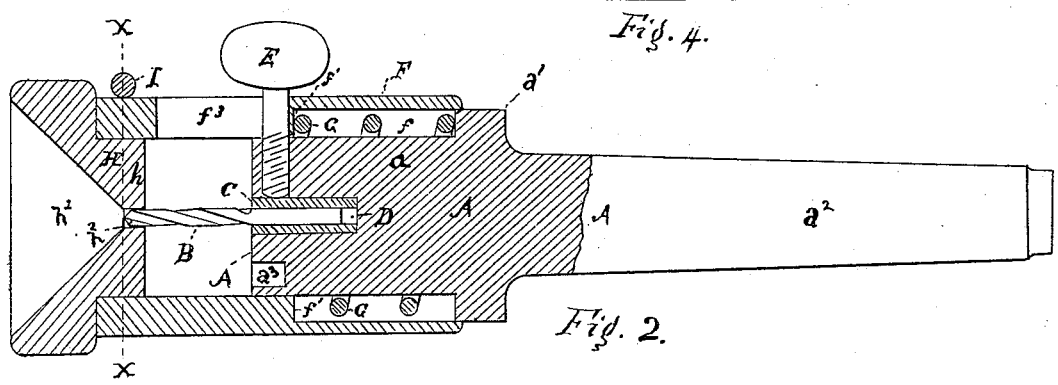

In the accompanying drawings, Figure 1 is an isometric view of a centering device provided with our improvement; Fig. 2, a central vertical longitudinal section of the same, except that a part of the tapering shank of the centering device is in side elevation; Fig. 3, a vertical transverse section on the line $x\,x$ in Fig. 2; Fig. 4, a plan and an end elevation of the spring-bushing.

The centering device proper, A, or part which carries the drill B, consists of a cylindrical body, $a$, provided at its rear end with an annular collar, $a'$, and with a tapering shank, $a^2$, of the usual form adapted to enter and fit a correspondingly-tapered opening in the end of a lathe-spindle.

The drill B may be held in the centering device A in any usual manner, and is here represented as being placed within a split bushing, C, placed in a hole, D, bored longitudinally in the front end of the body $a$, concentrically with the axis of said body, said bushing being compressed upon said drill by a set-screw, E, which turns radially in said body $a$ and thrusts against said bushing C. A sleeve, F, surrounds and fits the body $a$ near the front end of said body, and at its rear end is counterbored large enough to admit the collar $a'$ to form a chamber or space, $f$, between said sleeve F and said body $a$. Within the chamber $f$ is placed a spiral spring, G, of wire, which is compressed between the collar $a'$ and the shoulder $f'$, formed by the front end of the chamber $f$. A longitudinal slot, $f^2$, is cut radially through one wall of the sleeve F, and through this slot projects the shank of the radial set-screw E, to limit, by striking the rear wall of said slot, the forward motion of said sleeve, said slot being long enough to allow the sleeve to be moved backward a sufficient distance.

In the outer end of the sleeve F, and concentrically therewith, is secured a centering-plug, H, the same being circular in cross-section, the reduced diameter $h$ of which enters the front end of the sleeve, and is retained therein by a double key, I, the same being in shape like a staple or U, the parallel sides of said key entering holes drilled partly in said sleeve and partly in the reduced diameter of said centering-plug H.

The centering-plug H is provided in its front end with a conical opening, $h'$, the axis of which is in a line with the axis of said centering device, and is also provided with a central longitudinal hole, $h^2$, concentric with the axis of said centering device and large enough to admit the drill B.

It is obvious that if the axis of the drill be in line with the axis of the centering device a cylindrical object being pressed endwise into the conical opening $h'$ will be concentric with said centering device, and that if such cylindrical body be pressed against the centering-plug with sufficient force said plug and the sleeve F will be pushed backward, compressing the spring G and causing the drill B to enter the center of said end of said cylindrical body. In the same way a body the cross-section of which is square or triangular may be centered without measurement and without the use of a prick-punch.

It will be seen that the centering-plug, sleeve, and drill, or any of them, may be removed from the centering device without removing the centering device from the lathe-spindle, and that the drill may be removed from the centering device through the centering-plug without removing the centering plug or sleeve from the body $a$.

We claim as our invention—

1. The combination, with a suitable body adapted to hold a drill concentrically therewith, of a sleeve having a smaller bore adapted to fit said body, and having also for a portion of its length an enlarged bore to receive and fit a collar with which said body is provided, and to form a chamber around said body, a spiral spring surrounding said body within the enlarged bore of said sleeve, between said collar and the shoulder formed by the small bore of said sleeve, said sleeve being provided with a longitudinal slot, and a screw turning in said body and projecting through said slot to retain said sleeve on said body, as and for the purpose specified.

2. The combination of a suitable body adapted to be secured to the spindle of a lathe and to be rotated therewith, and to hold a drill concentrically therewith, a sleeve having a smaller bore adapted to surround and fit said body, and having also for a portion of its length an enlarged bore adapted to receive a collar with which said body is provided, and to form a chamber around said body, a spiral spring surrounding said body within said chamber, between said collar and the shoulder formed by the smaller bore of said sleeve, said sleeve being provided with a longitudinal slot and a set-screw turning in said body and projecting therefrom through said slot to retain said drill in said body and to retain said sleeve on said body, as and for the purpose specified.

3. The combination of a suitable body adapted to hold a drill, a sleeve surrounding said body and adapted to slide thereon, a spring adapted to push said sleeve in advance of the point of a drill held in said body, a plug adapted to fit the end of said sleeve and provided with an axial hole concentric with the axis of said body and drill, said plug being provided in its front end with a conical opening concentric with said axial hole, and a U-shaped key, the sides of which are adapted to enter grooves or holes formed partly in the interior of said sleeve and partly in the exterior of said plug, to retain said plug in said sleeve and to allow the same to be removed from said sleeve upon the removal of said key, as and for the purpose specified.

JOSEPH DENO.
TIMOTHY H. REARDON.

Witnesses:
ALBERT M. MOORE,
EDWARD W. THOMPSON.